United States Patent Office 3,477,575
Patented Nov. 11, 1969

3,477,575
METHOD OF CONTINUOUS DYNAMIC FILTRATION AND AN APPARATUS FOR CARRYING OUT THE SAME
Jindřich Němec, Jan Kašpar, and Josef Soudek, Pardubice, Czechoslovakia, assignors to Vyzkumny ustav organickych syntex, Pardubice-Rybitvi, Czechoslovakia
Filed Dec. 19, 1967, Ser. No. 691,858
Claims priority, application Czechoslovakia, Dec. 21, 1966, 8,169/66
Int. Cl. B01d 29/36, 33/02, 33/28
U.S. Cl. 210—67
5 Claims

ABSTRACT OF THE DISCLOSURE

A suspension is continuously filtered by a first set of filter elements rotatably mounted on a hollow shaft and a second set of elements extending between the elements of the first set. The separated particles are continuously remixed with the suspension. The thickened suspension is discharged from the filter housing at a rate which is controlled by the difference between the instantaneous valve and a preset valve of the twisting moment necessary to rotate the shaft.

BACKGROUND OF THE INVENTION

This invention relates to a method of continuous dynamic filtration in general, and to a method of continuous dynamic filtration and thickening of difficultly filtrable suspensions in particular, as well as an apparatus for carrying out said method, wherein the density or viscosity of the suspension controls the twisting moment of the shaft carrying the rotary filtering elements, which moment in turn actuates other monitoring devices.

A disadvantage of well-known or conventional filtering methods performed by means of mostly stationary compressive apparatuses for filtering and thickening difficultly filtrable suspensions, for instance in the preparation of finely dispersed dyestuffs, some chemical compounds, and the like, consists in that very fine solid particles contained in the suspension to be dispersed are deposited on the respective filtering element whereby the filtering efficiency shows a successive reduction due to an increasing resistance offered by the ever-growing cake layer on the filtering element.

SUMMARY OF THE INVENTION

It is therefore a general purpose of the invention to overcome the disadvantage outlined above as well as other disadvantages with respect to the prior art.

In accordance with one feature of the invention we provide an improved method of dynamic filtration of suspensions consisting in that the suspension is passed over a filtering element at either side of which a pressure gradient is established. The filter cake being built on the filtering element is immediately fluidized and in this condition intermixed with the suspension to be filtered. The suspension thickened in this way is permanently kept in fluid state and forms a relatively thick thixotropic pulp. The filter cake deposited on filtering difficultly filtrable suspensions possesses, as well known, thixotropic properties so that even in case of rather very high concentrations it remains in fluid state, if intensively agitated.

In the method of filtering according to the present invention the thickened suspension of the material to be filtered can be considered as such a suspension, as hereinbefore set forth. Further it is well known that the viscosity of suspensions depends upon the concentration of solid particles contained therein. It has been found out that the twisting moment necessary for the drive of the shaft carrying the rotary filtering elements, is directly proportional to the suspension viscosity; this knowledge which will hereinafter be referred to in detail, has been utilized in solving the task of controlling the discharge rate of the thickened suspension delivered from the dynamic filtering apparatus according to the invention. Thus the control of an additional device for discharging the thickened suspension, depending on a difference between an instantaneous on the one hand and the preset torque necessary for the filter shaft drive on the other hand, enables in the continuous operation to check the quality of the filtered suspension in an easy, reliable and ready manner.

Further the present invention provides two alternate embodiments, that is, on the one hand, a method of discharging the thickened suspension continuously, or, on the other hand, of discharging it batchwise. With the former embodiment the rate of discharging the thickened suspension can be controlled substantially in two different ways; in the first of them the change of the discharging rate does not depend but upon the positive, or negative sign of the twisting moment, i.e. if the instantaneous twisting moment is higher than the preset value thereof, the discharging rate shows an increase, while if it is lower than the preset value, the discharge value will be reduced. In the second way of changing the rate of discharging of the filter cake, the same is proportional to an absolute value of the difference between the instantaneous and the preset twisting moment.

In the event the discharging of the thickened suspension is periodically interrupted, the start impulse for the discharge is given when the difference between the two aforesaid values of the instantaneous and the preset twisting moment reaches positive quantities; on the contrary, if said difference between the torque values drops to a negative quantity, an impulse is given for stopping the discharge action.

An apparatus for carrying out the aforesaid method comprises substantially two systems of filter bodies, of which one is adapted to rotate together with a shaft extending through a hermetically closed vessel and is constituted by a set of spaced filter bodies while the other is stationary and consists of a set of filter bodies supported on the inner wall of the vessel, the latter extending into spacings left between the former, and vice versa. Between an electric motor for driving the shaft, and the dynamic filter assembly a torque metering instrument is interconnected, which instrument is equipped with a scanner of torque limit values controlling a device for regulating the rate of discharging the thickened suspension.

The novel features which are considered as characteristic for the invention as set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE INVENTION

DESCRIPTION OF THE PREFERRED EMBODIMENTS

Figure 1:
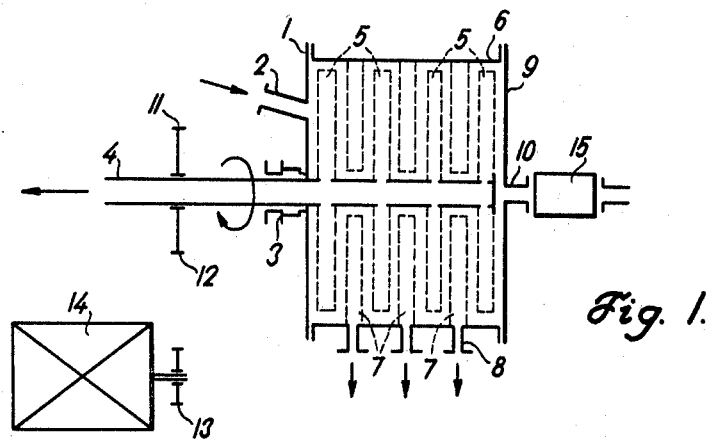
FIG. 1 shows a schematic view of an apparatus for continuous filtration in an axial section.

Discussing now the drawings in detail, and firstly FIG. 1 thereof, it will be seen that the novel apparatus for continuous filtration comprises a closed pressurized vessel 6 having a cover 1 provided with a neck 2 for supply the suspension to be processed and with a central opening tightened by means of a gasket 3 to avoid leakage along the entering portion of a hollow shaft 4 which will hereinafter be referred to in detail. Co-axially with respect to the vessel 6 the hollow shaft 4 extends through the same and supports a set of spaced hollow filter bodies 5. In the vessel 4 there are moreover provided hollow filter bodies 7 which are secured to the inner wall thereof and extend into the spacings left between the individual filter bodies 5. The stationary filter bodies 7 having an annular form are provided each with a neck 8 discharging on the circumference of the vessel 4 and designed for filtrate delivery, while the same from the rotary filter bodies 5 is delivered through the cavity of the hollow shaft 4 to the left, as shown in FIG. 1 by means of an arrow. The right-hand cover 9 or bottom closing the vessel 4 is provided with a neck 10 designed for the delivery of the thickened suspension; reference numeral 15 designates a device for controlling thickened suspension discharge. The filter bodies 5 and 7 are provided with suitable filtering elements. The hollow shaft is driven from an electric motor 14 by the intermediary of suitable power transmission means, such as, for example, pulleys 13 and 11 supported on the motor shaft and the hollow shaft 4, respectively, and a belt 12.

In operation the suspension to be processed is continuously supplied into the vessel 6 through the neck 2 by means of a superatmospheric pressure, is passed sucessively through gaps left between the two sets of filter bodies 5 and 7, the filtrate passing through the respective filtering element covering the said filter bodies 5 and 7, and being finally delivered through the hollow shaft 4 and through the necks 8, respectively. Due to the rotation of the filter bodies 5 an intensive agitating action between the filtering bodies 5 and 7 takes place, which action causes the filter cake liable to deposit itself permanently on the filtering element, to get fluidized and intermixed with the filtered suspension immediately upon, its own formation. The suspension is passed through the vessel 6 in the direction from the cover 1 to the cover 9, the concentration thereof being successively increased till it attains its maximum value in the room between the last filter body 5 and the cover 9.

The rotary filter bodies 5, or the stationary filter bodies 7 may optionally be substituted, but only either of them, by non-filtering plates. The spacing between the two adjacent filter bodies 5 and 7 is realtively narrow, say, between one and 30 milimeters.

The total number $n$ of the rotary bodies (of filtering, or non-filtering character) may correspond in general to $n$ plus one stationary bodies (of again filtering, or non-filtering character), or, alternately, to $n$ minus one stationary bodies including the anterior and posterior covers 1 and 9, respectively, $n$ being an integer which equals, or is higher than one.

In the embodiment shown in FIG. 1 $n$ equals four.

Figure 2:
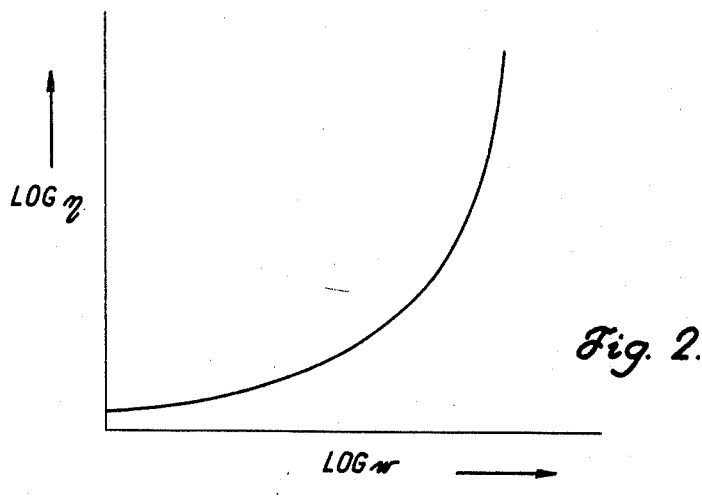
FIG. 2 is a plot showing the nonlinear dependence of the viscosity upon the concentration of solid particles in a suspension.

FIG. 2 shows a plot representing graphically the relation between logarithmic values of viscosity of a suspension and the concentration of solid particles contained therein, the viscosity and concentration values being read off from abcissa and ordinate, respectively.

Figure 3:
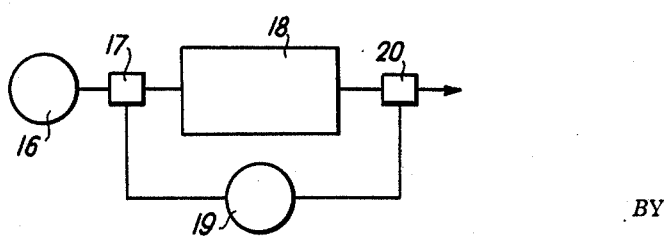
FIG. 3 is a schematic view of a filtering apparatus equipped with a suspension discharge control.

In the embodiment, as shown in FIG. 3, an additional device for controlling the discharge of the thickened suspension from the dynamic filter assembly according to the present invention comprises a torque metering instrument and a regulator designed as monitoring means for the discharge control of the thickened suspension. The process of metering the twisting moment may be carried out in any suitable manner, such as, for instance, by a dynamometer, by metering electric motor input, and the like.

FIG. 3 shows a total schematic view of such an arrangement, which comprises a driving electric motor 16, a torque meter 17, a dynamic filter assembly 18, a discharge control regulator 19, and the device 20 for discharging the thickened suspension. In the operation the scanned torque value is transmitted to the regulator, in which the reference value of the twisting moment has been preset, in accordance of which in turn the discharge control device for the thickened suspension is monitored. In case the twisting moment is lower (or higher) than the preset value, the regulator will give an impulse to reduce, or increase) the amount of the suspension delivered in the continuous process, or, on the other hand, if the suspension discharge is periodically interrupted, to stop (or start) the discharging operation. The twisting moment can be metered either directly by means of a dynamometer, or indirectly by determining the electric motor load by wattmeter, or ampere meter. From the technological standpoint the wattmeter torque measuring method has been found preferable on the basis of numerous tests carried out, the wattmeter 17 being equipped with a contactless scanner of continuously presettable limit values, and the discharge control device being represented by a pneumatically, hydraulically, or electrically controlled valve, or a discharge pump. After the preset value has been attained the regulator is given a signal from the scanner, whereupon the regulator gives an impulse for opening the valve, or for starting the discharge pump. On the other hand, if the electric motor load drops below the preset torque value, the limit value scanner gives a signal to the regulator which in turn gives an impulse for closing the valve, or for stopping the discharge pump.

While the invention has been illustrated and described as embodied in a method of and apparatus for continuous dynamic filtration, it is not intended to be limited to the details shown, since various modifications and structural changes may be made without departing in any way from the spirit of the present invention.

Without further analysis, the foregoing will so reveal the gist of the present invention that others can by applying current knowledge readily adapt it for various application without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. Method of continuous dynamic filtration of suspensions containing solid particles dispersed in a liquid, wherein the suspension is maintained in a vessel on one side of at least one filtering element rotatably mounted on a hollow shaft and is intensively agitated, the liquid being passed through the filtering element, and the solid particles, which are concentrated on the filtering element, forming a filter cake which is permanently intermixed with the suspension with which it forms a relatively thick thixotropic pulp, the thickened suspension causing increase in the value of the twisting moment necessary to drive said shaft, controlling the discharge of the thickened suspension from the vessel according to the difference between the instantaneous valve and a preset valve of said twisting moment.

2. Method of continuous dynamic filtration of suspension containing solid particles dispersed in a liquid, wherein the suspension is maintained in a vessel on one side of at least one filtering element rotatably mounted on a hollow shaft and is intensively agitated, the liquid being passed through the filtering element, and the solid particles, which are concentrated on the filtering element, forming a filter cake which is permanently intermixed with the suspension with which it forms a relatively thick thixotropic pulp, the thickened suspension causing increase in the value of the twisting moment necessary to drive said shaft, controlling the discharge of the thickened suspension from the vessel according to the difference between the instantaneous valve and a preset valve of said twisting moment, the discharge of the thickened suspension being continuous and the rate thereof being increased, if the instantaneous twisting moment is higher than the preset value thereof, and vice versa.

3. Method of continuous dynamic filtration of suspensions containing solid particles dispersed in a liquid, wherein the suspension is maintained in a vessel on one side of at least one filtering element rotatably mounted on a hollow shaft and is intensively agitated, the liquid being passed through the filtering element, and the solid particles, which are concentrated on the filtering element, forming a filter cake which is permanently intermixed with the suspension with which it forms a relatively thick thixotropic pulp, the thickened suspension causing increase in the value of the twisting moment necessary to drive said shaft, controlling the discharge of the thickened suspension from the vessel according to the difference between the instantaneous valve and a preset valve of said twisting moment, the discharge of the thickened suspension being continuous and the discharge rate increase being proportional to the difference of a value of the instantaneous twisting moment and a preset value thereof.

4. Method of continuous dynamic filtration of suspension containing solid particles dispersed in a liquid, wherein the suspension is maintained in a vessel on one side of at least one filtering element rotatably mounted on a hollow shaft and is intensively agitated, the liquid being passed through the filtering element, and the solid particles, which are concentrated on the filtering element, forming a filter cake which is permanently intermixed with the suspension with which it forms a relatively thick thixotropic pulp, the thickened suspension causing increase in the value of the twisting moment necessary to drive said shaft, controlling the discharge of the thickened suspension from the vessel according to the difference between the instantaneous valve and a preset valve of said twisting moment, the filter cake being discharged, if the difference between the instantaneous twisting moment value and the preset value thereof is positive, whereas the filter cake discharge being stopped, if said difference is negative.

5. A filter apparatus comprising, in combination,
(i) a closed pressurized vessel having means for positively supplying suspension to be processed thereinto and discharging it therefrom respectively by means of a pressure gradient established therein;
(ii) a hollow rotary shaft extending axially through said vessel, means to hermetically seal the ends of the shaft to adjacent portions of said vessel, a first set of axially spaced elements mounted on said shaft and each extending radially outwardly therefrom;
(iii) a second set of axially spaced elements secured to the inner wall of said vessel and extending into the spacings left between the elements of said first set, the elements of at least one of said first and second sets being filter elements and include means to discharge filtrate therefrom;
(iv) an electric motor operatively connected to said shaft to drive the same;
(v) means to discharge the thickened sludge from the vessel, a regulator to control said discharge means; and
(vi) a torque metering instrument interconnected between said electric motor and said regulator, said instrument being equipped with a scanner of torque limit values, said regulator and said instrument being constructed and arranged to control the rate of discharge of the thickened suspension according to the difference between an instantaneous valve and a preset valve of the twisting moment necessary to rotate said shaft.

References Cited
UNITED STATES PATENTS

| | | | |
|---|---|---|---|
| 1,344,215 | 6/1920 | Sweetland | 210—327 |
| 2,454,653 | 11/1948 | Kamp | 210—96 X |
| 2,799,397 | 7/1957 | Berline | 210—332 X |
| 3,212,639 | 10/1965 | Anderson | 210—67 X |

SAMIH N. ZAHARNA, Primary Examiner

U.C. Cl. X.R.
210—77, 96, 332